United States Patent
Fellers et al.

(10) Patent No.: US 11,330,081 B1
(45) Date of Patent: May 10, 2022

(54) MIGRATING CONFIGURATION ACROSS INFORMATION HANDLING SYSTEMS AGNOSTIC OF OPERATING SYSTEMS

(71) Applicant: DELL PRODUCTS, LP, Round Rock, TX (US)

(72) Inventors: Andrew Fellers, Round Rock, TX (US); Eric Fredrickson, Cedar Park, TX (US); Matthew Hilleque, Round Rock, TX (US); Sunil Kumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/222,468

(22) Filed: Apr. 5, 2021

(51) Int. Cl.
*H04L 67/00* (2022.01)
*H04L 67/306* (2022.01)
*H04L 41/08* (2022.01)
*G06N 20/00* (2019.01)
*H04L 41/0869* (2022.01)
*G06K 9/62* (2022.01)

(52) U.S. Cl.
CPC ............ *H04L 67/34* (2013.01); *G06K 9/6256* (2013.01); *G06N 20/00* (2019.01); *H04L 41/0869* (2013.01); *H04L 41/0886* (2013.01); *H04L 67/306* (2013.01)

(58) Field of Classification Search
CPC ....... H04L 67/34; G06N 20/00; G06K 9/6256
USPC ...................................................... 709/203
See application file for complete search history.

(56) References Cited

U.S. PATENT DOCUMENTS

| | | | |
|---|---|---|---|
| 7,577,829 B2 | 8/2009 | Dennis | |
| 8,650,157 B1* | 2/2014 | Jha | G06F 11/1453 707/640 |
| 8,798,607 B1* | 8/2014 | Kaplan | H04M 1/2757 455/418 |
| 2008/0028102 A1* | 1/2008 | Peacock | G06F 9/544 709/248 |

(Continued)

OTHER PUBLICATIONS

Microsfot, User State Migration in Windows XP, Jun. 1, 2001, www.microsoft.com,http://www.microsoft.com/technet/prodtechnol/winxppro/deploy/usermigr.mspx (Year: 2001).*

(Continued)

*Primary Examiner* — Zi Ye
(74) *Attorney, Agent, or Firm* — Larson Newman, LLP

(57) ABSTRACT

An information handling system has an abstraction layer that may receive a request from an agent to import a configuration setting to a first client device with a first operating system, wherein the configuration setting is associated with a user identifier. If the first operating system and a second operating system are different, then first configuration data may be transmitted to the translation layer, wherein the first configuration data is associated with the second operating system. A translation layer may receive the first configuration data from the abstraction layer, translate the a second configuration data based on the first configuration data to a translated configuration setting; and transmit an instruction associated with the translated configuration setting to an agent command layer. The agent command layer may transmit the instruction to the agent to replicate the second configuration setting of the second client device on the first client device.

17 Claims, 9 Drawing Sheets

(56) References Cited

U.S. PATENT DOCUMENTS

2016/0037331 A1* 2/2016 Vernon ............... G06Q 10/107
 455/414.1
2019/0324769 A1 10/2019 Ganesan et al.
2020/0358874 A1 11/2020 Popli et al.

OTHER PUBLICATIONS

Sebastianraschka, Machine Learning FAQ, Dec. 4, 2016, Sebastianraschka.com, https://web.archive.org/web/20161204204235/http://sebastianraschka.com:80/faq/docs/logisticregr-neuralnet.html (Year: 2016).*

NetApp, What is Machine Learning, Oct. 21, 2020, netapp.com, https://web.archive.org/web/20201021070839/https://www.netapp.com/artificial-intelligence/what-is-machine-learning/ (Year: 2020).*

Zhou, Graph Neural Networks: A Review of Methods and Applications, Dec. 202, 2018, arxiv.org, https://arxiv.org/pdf/1812.08434v1.pdf (Year: 2018).*

ITEngineer, PowerShell to check file exist in the destination folder before exporting the Exchange email as .PST?, Aug. 19, 2018, sapien.com, https://www.sapien.com/forums/viewtopic.php?t=12998 (Year: 2018).*

\* cited by examiner

800

| Command 805 | Target Operating System 810 | | |
|---|---|---|---|
| | Microsoft Windows | ChromeOS | Linux (Ubuntu) |
| Move File | "move <file name> <file location>" | set StorageArea.set(object items, function callback) | "mv<file name><file folder>" |
| Set Desktop | reg add "HKEY_CURRENT_USER\Control Panel\Desktop" /v Wallpaper /t REG_SZ /d <wallpaper_path> /f | chrome.wallpaper.setWallpaper({"url":'http://example.com/a_file.jpg','layout':'CENTER_CROPPED','filename':'test_wallpaper'},function() }) | gsettings set org.gnome.desktop.background picture-uri file:///<Path/to/file/filename.jpg> |
| Accesssibilty Features | | | |
| Large Cursor | reg add "HKEY_CURRENT_USER\Control Panel\Cursors" /v | chrome.accessiblityFeatures.largeCursorEnabled | $ gsettings set org.gnome.desktop.interface cursor-size <sizeinPixels> |
| Speech to Text | reg add "HKEY_CURRENT_USER\Software\Microsoft\Common\SpeechToText" /y | chrome.accessiblityFeatures.spokenFeedbackEnabled | |
| Pin to taskbar/ launcher | reg add HKLM\SOFTWARE\Microsoft\Windows\CurrentVersion\Explorer\ /v <LayoutXMLPath> /d C:\Windows\OEM\<TaskbarLayoutModification.xml> | "{ 'name': 'PinnedLauncherApps', 'type': 'list', 'schema': {'type': 'array','items',{type':'string'}, }" | $ gsettings set org.gnome.shell favorite-apps "['app1.desktop','app2.desktop','app3.desktop']" |
| Magnifier | reg.add HKEY_CURRENT_USER\Software\Microsoft\ScreenMagnifier | set screenMagnifier.get(object details, function callback) | $ gsettings set org.gnome.desktop.interface.text-scaling-factor [scaling-factor-value] |
| On-Screen Keyboard | reg add HKEY_LOCAL_MACHINE\SOFTWARE\Microsoft\StrgRegKey\Typing\TaskbarAvoidanceEnabled /t REG_DWORD /d 1 | set virtualKeyboard set (object details, function callback) | $ gsettings set org.gnome.desktop.screensaver embedded-keyboard-enabled true |
| High Contrast | reg add HKEY_CURRENT_USER\CONTROL PANEL\ACCESSIBILITY\HIGHCONTRAST /t REG_SZ /d 127 | set highContrast.set(object details, function callback) | $ gsettings set org.gnome.desktop.wm.preferences theme "UbuntuHighContrastBlack" |

| | | Node *j* | | | | | | | |
|---|---|---|---|---|---|---|---|---|---|
| | | 1 | 2 | 3 | 4 | 5 | 6 | 7 | 8 |
| Node *i* | 1 | 1 | 1 | 1 | 0 | 0 | 0 | 0 | 0 |
| | 2 | 1 | 1 | 0 | 1 | 1 | 0 | 0 | 0 |
| | 3 | 1 | 0 | 1 | 0 | 0 | 1 | 1 | 1 |
| | 4 | 1 | 1 | 0 | 1 | 0 | 0 | 0 | 0 |
| | 5 | 1 | 1 | 0 | 0 | 1 | 0 | 0 | 0 |
| | 6 | 1 | 0 | 1 | 0 | 0 | 1 | 0 | 0 |
| | 7 | 1 | 0 | 1 | 0 | 0 | 0 | 1 | 0 |
| | 8 | 1 | 0 | 1 | 0 | 0 | 0 | 0 | 1 |

US 11,330,081 B1

MIGRATING CONFIGURATION ACROSS INFORMATION HANDLING SYSTEMS AGNOSTIC OF OPERATING SYSTEMS

FIELD OF THE DISCLOSURE

The present disclosure generally relates to information handling systems, and more particularly relates to migrating configuration across information handling systems agnostic of operating systems.

BACKGROUND

As the value and use of information continues to increase, individuals and businesses seek additional ways to process and store information. One option is an information handling system. An information handling system generally processes, compiles, stores, or communicates information or data for business, personal, or other purposes. The needs and requirements of technology and information handling can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system has an abstraction layer that may receive a request from an agent to import a configuration setting to a first client device with a first operating system, wherein the configuration setting is associated with a user identifier. If the first operating system and a second operating system are different, then first configuration data may be transmitted to the translation layer, wherein the first configuration data is associated with the second operating system. A translation layer may receive the first configuration data from the abstraction layer, translate a second configuration data based on the first configuration data to a translated configuration setting; and transmit an instruction associated with the translated configuration setting to an agent command layer. The agent command layer may transmit the instruction to the agent to replicate the second configuration setting of the second client device on the first client device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 8 is a diagram illustrating an example of a lookup table for migrating a configuration across information handling systems agnostic of operating systems;

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
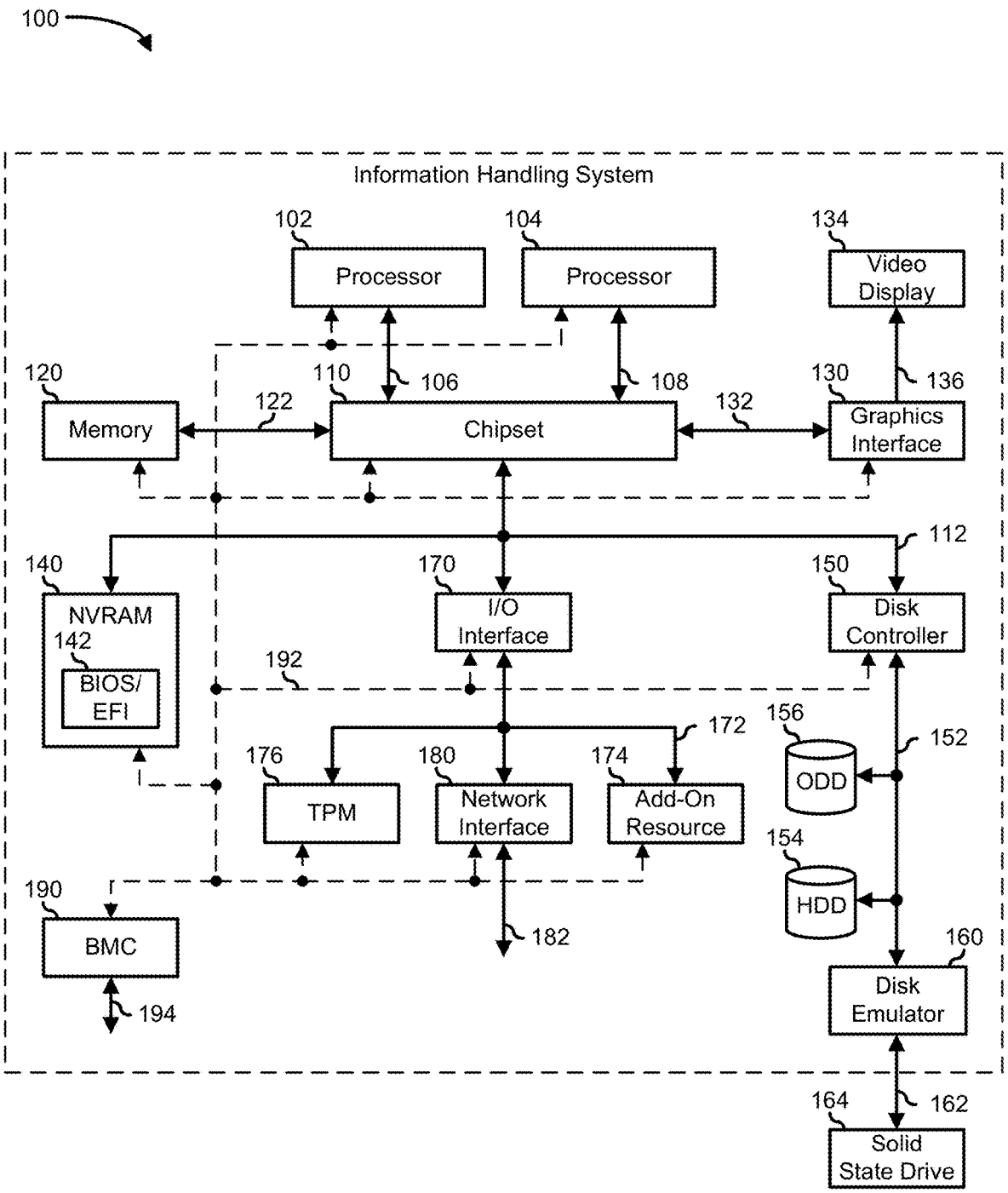
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random-Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

During the deployments of an operating system to various computing devices, the computing devices are generally provisioned prior to usage. When a computing device is provisioned, a process begins deploying and/or restoring applications, policies, and data to the device. However, there is a gap in the provisioning of the computing device as a user is left to restore their setup such as locations of user data, desktop icons, mouse sensitivity, brightness settings, power settings, etc. Typical migration solutions support limited computing devices and operating systems, and thus may not bridge the gap among different types of computing devices and/or operating systems. Therefore, there is a need for an operating system agnostic solution to address the above issues and other concerns. The systems and methods herein may be used to translate and/or to migrate configurations and/or device profiles to various client devices.

Figure 2:
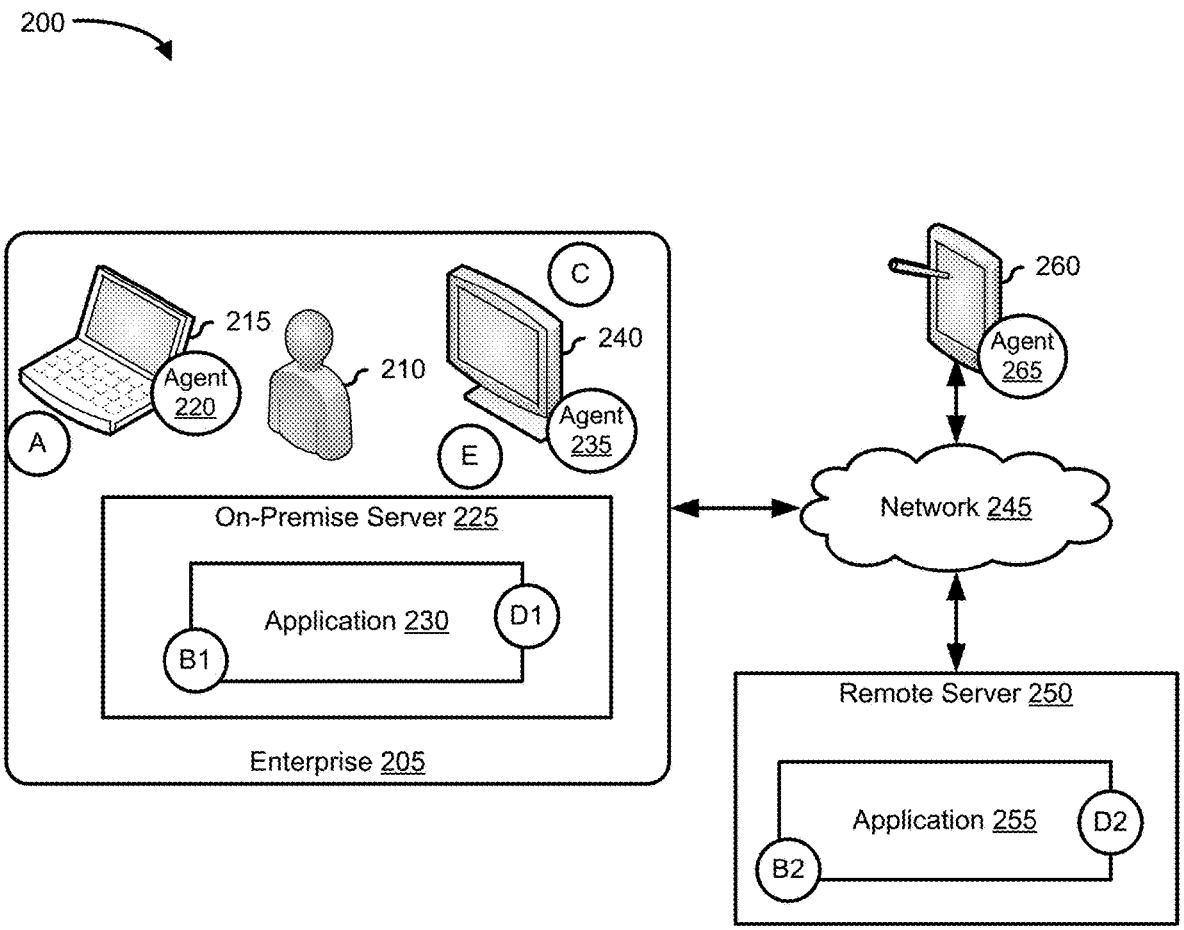
FIG. 2 is a block diagram illustrating an example of a system for migrating a configuration across information handling systems agnostic of operating systems, according to an embodiment of the present disclosure.

FIG. 2 shows an environment 200 where systems and methods for migrating configuration across information handling systems. The systems and methods herein are operating system agnostic and can be dynamically applied to multiple information handling systems. Environment 200 includes a framework with one or more on-premise servers and/or cloud storage, agents, and services running therein to translate and/or migrate configuration from one operating system to another operating system. Environment 200 includes an enterprise 205, a network 245, a remote server 250, and a client device 260. Enterprise 205 includes a user 210, a client device 215, and an on-premise server 225, and a client device 240. On-premise server 225 includes an application 230. Remote server 250 includes an application 255. Client device 215 includes an agent 220 while client device 240 includes an agent 235. In addition, client device 260 includes an agent 265. The components of environment 200 may be implemented in hardware, software, firmware, or any combination thereof.

Enterprise 205 includes several computer components that are interconnected to serve the needs of a business or organization. In addition, enterprise 205 may have one or more users that may utilize one or more of the client devices, wherein each of the client devices may have a different operating system or form factor. The present disclosure allows for on-the-fly configuration of the client devices according to a user's preference. In addition, the present disclosure allows for the administrator to deploy a desired baseline or configuration to the client devices.

User 210 may utilize client device 215, client device 240, and client device 260. User 210 may configure client device 215 creating a custom device and/or user profile, such as presentation, performance, mobile profile. User 210 may log in to client device 215 and configure one or more settings such as user settings, operating system settings, user preferences, and application settings. For example, if user 210 is a graphics artist then user 210 may configure the display settings and perform color calibration. User 210 may also use client device 240 and client device 260, thus it may be desirable to migrate the display settings and/or color calibration of client device 215 to client device 240 and client device 260.

Client device 215 which is similar to information handling system 100 of FIG. 1 may be a desktop computer, a laptop computer, a tablet computer, a handheld device, a cellular phone, a notebook computer, or any suitable information handling system. Client device 215 may be communicatively coupled to on-premise server 225. Client device 215 may also be communicatively coupled with remote server 250 through network 245. The client devices may communicate with on-premise server 225 and remote server 250 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol, Remote Desktop Protocol (RDP), or any suitable protocol or combination of protocols.

Agent 220 can be a software component installed in client device 215 to implement one or more techniques of the present disclosure. Agent 220 may be configured to determine the structure and configuration settings associated with the operating system and/or user logged into a client device 215 by interrogating the operating system and/or subsystems of client device 215. Agent 220 may be configured to scan, store, download, and upload configuration data to a user abstraction layer creating an abstract configuration of the configuration(s) of client device 215 and/or its operating system that is tied to the identity of user 210.

Agent 235 may be a software component that is similar to agent 220. When user 210 gets a new client device with another agent installed, synchronization may occur replicating the configuration(s) of client device 215 and/or its operating system that is tied to the identity of user 210. For example, when user 210 logs in to client device 240 that has agent 235 installed, the configuration settings and/or user profiles configured by user 210 at client device 215 may be automatically migrated by agent 235 and applied or replicated at client device 240. Agent 235 may be configured to apply one or more commands and/or instructions from remote server 250 or application 255 at client device 240 to migrate or replication the configuration(s). Similarly, when user 210 logins to client device 260 with agent 265, synchronization may occur replicating the configuration(s) tied to the identity of user 210.

On-premise server 225, which is similar to information handling system 100 of FIG. 1, maybe a standalone computing device or may be configured as an individual blade in a rack of several servers. On-premise server 225 may be a computing device, a desktop computer, a laptop computer, a corporate server, a web server, a platform application server, an application server, or any suitable information handling system. On-premise server 225 may be configured to host application 230. Remote server 250 which is similar to on-premise server 225 may be configured to host application 255 which is similar to application 230.

Application 230 may be configured to migrate or transition configuration settings and/or profiles from one client device to another client device agnostic of the operating system. This allows an enterprise to deploy operating systems to various client devices and migrate user-defined configuration settings and/or profiles automatically. Application 255 may be configured to include BIOS/UEFI firmware settings across architectures and platforms in enterprise 205 or to authorized devices communicatively coupled to enterprise 205 via network 245, such as client device 260.

Network 245 may use any one or more of a variety of networks or another type of communication connection as known to those skilled in the art. The type of communication connection used may vary with certain system parameters and requirements, such as those related to bandwidth and throughput required in accordance with a rate of data requests as may be issued by an information handling system. The communication connection may be a network connection, bus, and/or another type of data link, such as a hardwire connection, a network cable, wireless or WiFi® protocols, or other connections known in the art.

Network 245 may be implemented as or maybe a part of, a storage area network (SAN), a personal area network (PAN), a local area network (LAN), a metropolitan area network (MAN), a wide area network (WAN), a wireless local area network (WLAN), a virtual private network (VPN), an intranet, the Internet, or any other appropriate architecture or system that facilitates the communication of signals, data and/or messages. Network 245 may transmit data using any storage and/or communication protocol, including without limitation, fiber channel, frame relay, asynchronous transfer mode (ATM), internet protocol (IP), other packet-based protocol, SCSI, internet SCSI (iSCSI), serial attached SCSI (SAS), or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 245 and its various components may be implemented using hardware, software, or any combination thereof.

FIG. 2 is annotated with a series of letters A-E. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

Here, the configuration of client device 215 may be migrated to client device 240 and/or client device 260. The client devices may have the same or different operating systems. When the configuration is migrated, one or more configuration settings and/or profiles in the client device may be replicated at the target device. When user 210 changes the configuration of client device 215, the changes may also be applied to the configuration of client device 240 and/or client device 260. At stage A, user 210 logs in and configures client device 215 with a particular operating system. In one example, user 210 may be a graphics artist and configures display color settings of client device 215. Agent 220 may have been installed in client device 215 before user 210 configured client device 215. Client device 215 may be referred to as a source client device and its operating system as a source operating system.

At stage B1, agent 220 may transmit a configuration setting and/or associated data, collectively referred to herein as configuration information, to on-premise server 225. The configuration information may be associated with a user identifier and/or operating system information. The configuration information may be transmitted to an abstraction layer of application 230. In another embodiment, at stage B2, agent 220 may transmit the configuration information to remote server 250 via network 245. The configuration information may be transmitted to the abstraction layer of application 255. After receiving the configuration information, application 230 and application 255 may abstract and then store the configuration information in a data storage device. The abstracted configuration information can be used for migration to another client device.

At stage C, user 210 may log in to client device 240. In this example, client device 240 may have a different operating system than client device 215 and has not been configured by user 210. Agent 235 may detect the login and then sends a request to import or retrieve the configuration information associated with user 210 to on-premise server 225 or remote server 250. Client device 240 may be referred to as a target client device and its operating system as a target operating system. When sending the request, agent 235 takes the operating system of client device 240, also referred to as a target operating system, into account. For example, agent 235 may include an operating system identifier, name, description, etc. of the operating system in the request.

At stage D1, the abstraction layer determines the target operating system, if the target operating system is different from the source operating system found in the abstracted configuration information in storage then the configuration information may be translated for the target operating system prior to transmitting the translated configuration information to client device 240. The application, or in particular a translation layer, may be configured to retrieve the data abstraction model from the data abstraction layer or data storage and generates a translation of the configuration setting for the target client device. The translation layer determines the maximum subset between two configurations, the source configuration, and the target configuration, wherein the source configuration is the configuration associated with the source operating system and the target configuration is the configuration associated with the target operating system. The maximum subset may be used to determine a configuration mapping which may be used as a basis for the translation, also referred to as a translated configuration. If the target operating system is the same as the source operating system then the configuration information may be transmitted to client device 240.

Similarly, at stage D2, the target operating system is determined, if the target operating system is different from the source operating system then the configuration information may be translated prior to transmitting to client device 240. If the target operating system is the same as the source operating system then the configuration information may be transmitted to client device 240 without translation. At stage E, agent 235 may apply the configuration information received from application 230 or application 255.

Those of ordinary skill in the art will appreciate that the configuration, hardware, and/or software components of environment 200 depicted in FIG. 2 may vary. For example, the illustrative components within environment 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
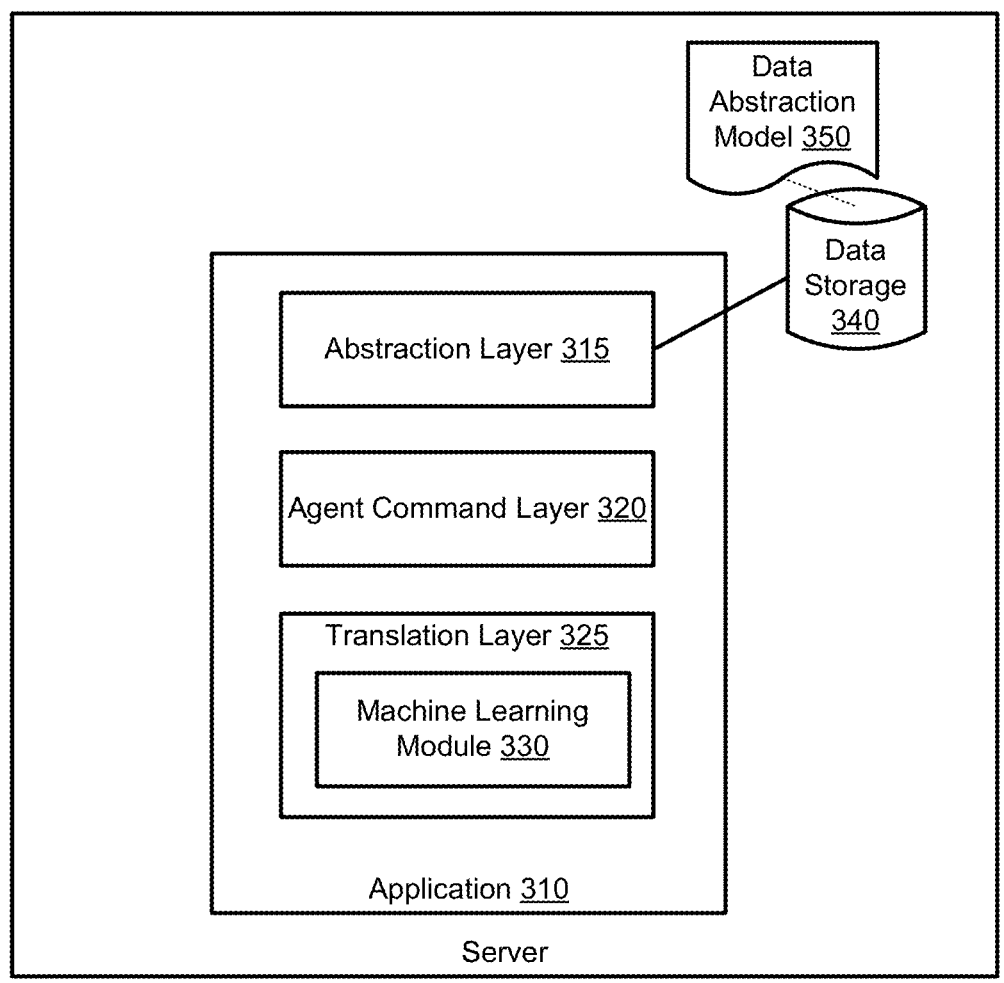
FIG. 3 is a block diagram illustrating an example of a system for migrating a configuration across information handling systems agnostic of operating systems.

FIG. 3 shows a server 300 for migrating configuration information across information handling systems agnostic of operating systems. Server 300 includes an application 310 and data storage 340. Application 310 is similar to application 230 and application 255 of FIG. 2. Different software layers reside in application 310 which may be located on an on-premise or remote server that is accessible to the source and/or target client device. In another embodiment, the different software layers may reside in at least two servers, wherein one or both servers may be located on-premise or remotely.

Application 310 includes an abstraction layer 315, an agent command layer 320, and a translation layer 325 that includes a machine learning module 330. Abstraction layer 315 is communicatively coupled to a data storage 340 which stores a data abstraction model 350. Abstraction layer 315 may be configured to interface with agent command layer 320 and translation layer 325. Agent command layer 320 may be configured to interface with translation layer 325 which may be configured to interface with abstraction layer 315 and agent command layer 320.

Abstraction layer 315, also referred to herein as a user abstraction layer, may be configured to receive and store configuration information from an agent installed in a client device. The configuration information may include the presentation, performance, and mobile profiles such as registry settings in Microsoft Windows®. The configuration information may be abstracted from the structure of the client device and operating system. The abstracted configuration information and/or data abstraction model may also be deduplicated and associated with a user identifier. The abstracted configuration information which includes custom device configuration and/or user profile may be updated automatically as changes occur. A delta for each change in the configuration information may be maintained.

The abstracted configuration data, such as data abstraction model 350, may be stored in a data storage device, such as data storage 340. Data abstraction model 350 may describe the structure and configuration information of a client device and/or an operating system that is associated with a user identifier. The abstracted configuration information may include one or more configuration files in any format, including but not limited to text files, extensible markup language (XML) files, hypertext markup language (HTML) files, or proprietary files such as Microsoft Word® or Microsoft Excel® spreadsheets, and the like. The configuration files may include executable code, non-executable data such as images, help files, templates, etc. The configuration files may also be a combination of executable and non-executable data. Data abstraction model 350 may be updated based on the detected changes in the structure and configuration information received from the agent.

Agent command layer 320 may be configured to relay commands and/or instructions from abstraction layer 315 and/or translation layer 325 to an agent of a client device. The agent may then apply the command and/or instructions to the target client device and/or operating system. Agent command layer 320 may relay commands from abstraction layer 315 and/or translation layer 325 to the agent installed in the target client device.

Translation layer 325 may be configured to translate the abstracted configuration from the source client device before migrating to the target client device if the source operating system is different from the target operating system. Translation layer 325 may be configured to determine a target configuration setting, user profile, user state, etc. that may match a source configuration setting, user profile, user state, etc. from the abstracted configuration. The translation may be based on a dataset comparison and/or a machine learning algorithm. Translation layer may transmit a set of commands based on the translation to agent command layer 320.

Translation layer 325 may be configured to analyze the user abstraction model per operating system. In addition, the analysis may be performed based on various configurations such as operating system configuration, user configuration, application configuration, etc. Typically, static analysis while application configuration analysis may be more dynamic with other configurations such as user configuration. The analysis may include identifying similar structures between the source operating system and the target operating system based on one or more attributes. In a particular embodiment, these structural similarities can be determined by a neural network, using the information yielded from the node attribute expansion (node classification) phase of model pre-training. The analysis may be performed to maximize the representation of the source operating system configuration settings on the target operating system as not every configuration setting will map. For example, the analysis may use a lookup table similar to lookup table 800 of FIG. 8. The analysis may determine the maximum number of commands and/or accessibility features that map between the source operating system and the target operating system.

A "readiness to switch" threshold of the abstracted configuration to the target operating system or target client device may be determined using one or more factors. For example, the readiness to switch threshold may be based on identifying a first set of data to be preserved versus the second set of data that can be discarded. For example, data that has not been used within a specified timeframe may be discarded, suggesting its readiness to switch. Conversely, the readiness to be switched threshold may not be reached if the abstracted configuration includes a set of data that has to be preserved. The readiness to switch threshold may also be based on identifying data that are restricted to a particular operating system, such as data with file extension restrictions. In addition, the readiness switch threshold may be based on the quantity of data that is local to the client device. File extension restrictions may refer to the file extensions present in the client device that is restricted to the particular operating system. In particular, the readiness to switch threshold may be based on the number of applications, the quantity of associated data, and frequency of usage specific to the source operating system. For example, configuration information associated with a user that frequently accesses Microsoft Outlook® archive (.pst) files or macro-enabled Microsoft Excel® (.xlsm) files may not be considered ready to switch to a non-Windows operating system.

Translation layer 325 may also use a machine learning algorithm in doing the analysis. In one embodiment, translation layer 325 may be configured to include a machine learning module 330 which probabilistically "guesses" or determines which setting from a first operating system matches a dataset for a second operating system based on a dataset comparison. Machine learning algorithms can be trained to recognize and build up the translation layer's capabilities for scalability for new operating systems, features, and/or configuration settings. These new operating systems, features, and/or configuration settings are not included in the data abstraction model and/or configuration information currently stored by abstraction layer 315.

Translation layer 325 may use various machine learning techniques such as convolutional neural networks, graph neural networks, graph convolutional networks, recurrent neural networks, etc. In one embodiment, the translation layer may use a graph neural network to analyze structures and/or relationships of the data abstraction model using embedded graphs such as a graph of directory trees within the file system of an operating system. The analysis may include determining static structures such as the layout of the operating system. In particular, the analysis may determine the static structure of the Microsoft Windows operating system layout. The static structure may be then compared with a static structure of a Linux operating system layout. The analysis may also include determining dynamic structures such as the layout of temporary folders, backup folders, etc. Similarly, the dynamic structure of a first operating system may be compared with the dynamic structure of a second operating system. A mapping of the configuration settings may be performed based on the above static and/or dynamic structure comparisons.

Enough data may need to be collected for new operating systems before a machine learning algorithm can be used by the translation layer. A new operating system may refer to an operating system that is not recognized by the abstraction layer. Additional data may also need to be collected for operating systems with insufficient data before the machine learning algorithm may be used. The quantity of data for collection may be pre-determined by an administrator and/or a translation confidence level. High-level translations, such as via lookup table 800 of FIG. 8, may be used until the pre-determined quantity of data has been collected. The translation layer may also continue to use the high-level translations until a translation confidence level is reached. For example, high-level translations may be used until the machine learning algorithm reaches the translation confidence level that configuration setting A on the source operating system maps to configuration setting B on the target operating system. After the translation confidence level is reached, the translation layer may go into a maintenance phase of the data abstraction model. The maintenance phase may be used to detect a change or an anomaly in the translation confidence level and perform adjustments accordingly.

Figures 9, 10:
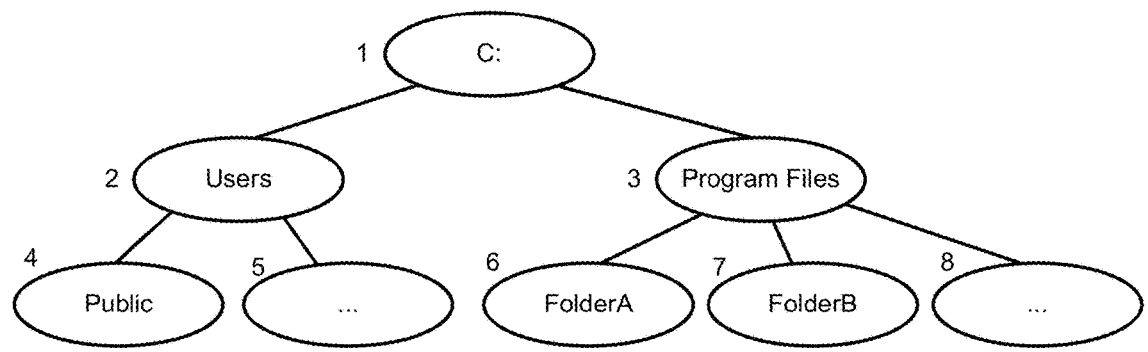
FIG. 9 is a diagram illustrating an example of a graph of a file structure for migrating a configuration across information handling systems agnostic of operating systems.
FIG. 10 is a diagram illustrating an example of an adjacency matrix for migrating a configuration across information handling systems agnostic of operating systems.

Translation layer 325 may be configured to use a graph neural network such as a graph convolutional network to generate one or more inferences from graph-structured data. Depending on the implementation and/or technology used in the translation layer, the file system can be represented in different ways. For example, multiple drives and/or partitions may be graphed as a batch as applicable such as with one graph per file system. In another example, a single system-level graph may be used in mapping across drives and/or partitions. In one example, the file system may be represented as an adjacency matrix such as shown in FIG. 10. Given a graph, such as graph 900 of FIG. 9, the graph neural network takes an adjacency matrix A, a node attributes matrix X, and an edge attributes matrix E as inputs. Data collected may undergo pre-processing which includes data preparation and other considerations before applying a machine learning algorithm. The data preparation and considerations may be based on the machine learning algorithm to be used. For example, for graph neural networks, the data preparation may include ensuring that the nodes can self-loop, determining node connectivity to detect embedded structures, and choosing activation functions to play different roles.

Node connectivity is determined by weighting and normalizing a degree matrix D. For example, the degree matrix D may be the total possible traversals from one folder (node) to another folder. The form of normalization may vary based on desired preservation and/or importance placed on certain node attributes, such as file properties or attributes, frequency of utilization, etc. The weights may represent the connectivity of the nodes in the graph, such as how strongly a folder is linked to other folders in the "neighborhood." The activation functions for the present disclosure may be chosen to preserve dimensionality and structural relationships in the file system. These activation functions may be used to classify structures as static or dynamic.

Translation layer 325 may then apply the graph neural network after the data preparation and consideration. After applying the graph neural network to the data abstraction model, a logistic regression analysis may also be performed. The graph neural network training may be memory intensive. To address this issue, translation layer 325 may be configured to split a graph into sub-graphs based on the size of the dataset and train the sub-graphs in parallel using a batch algorithm. The training may be aligned with the attributes associated with the readiness to switch concept based on identified folders and/or files to be preserved, discarded, or does not need representation in the target operating system. The training may be supervised or semi-supervised based on node attribute expansion and user data anonymization or privacy requirements.

Although abstraction layer 315, agent command layer 320, and translation layer 325 are shown to be included in server 300. The layers may be distributed into one or more servers that are on-premise or accessible remotely in any combination. For example, abstraction layer 315 may be deployed in server 300 and an agent command layer 320 and translation layer 325 may be deployed in another server. In another example, abstraction layer 315 may be deployed in server 300 while agent command layer 320 is deployed in a second server, and translation layer 325 deployed in a third server.

Figure 4:
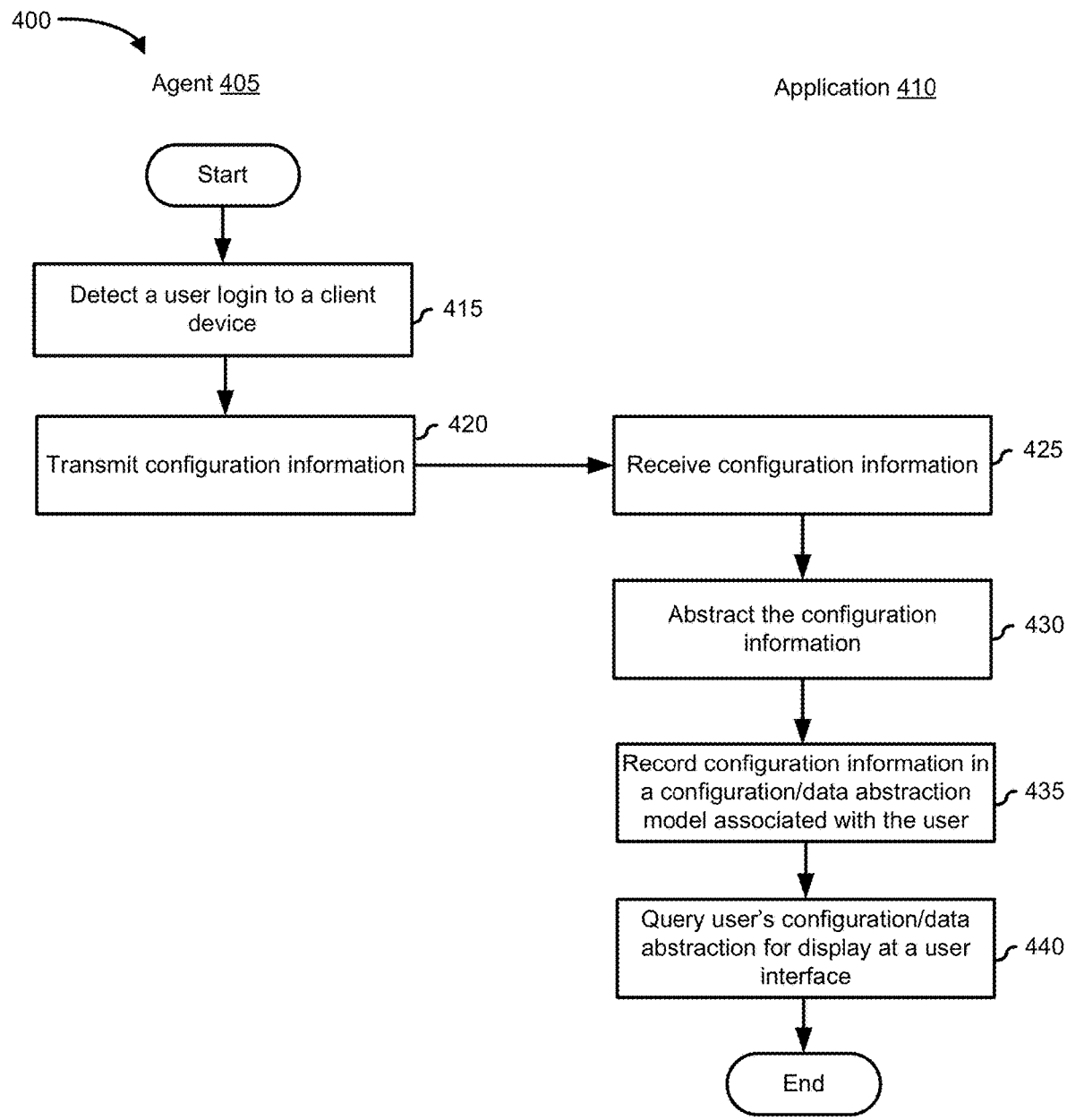
FIG. 4 is a flowchart illustrating an example of a method for setting up the configuration for migration across information handling systems agnostic of operating systems, according to an embodiment of the present disclosure.

FIG. 4 illustrates a method 400 for setting up configuration information for migration across information handling systems agnostic of operating systems. Method 400 may be performed by one or more components of environment 200 of FIG. 2 and server 300 of FIG. 3. Agent 405 may perform block 415 and block 420. Application 410 may perform block 425, block 430, block 435, and block 440. Agent 405 may be similar to agent 220, agent 235, or agent 265 of FIG. 2. Application 410 may be similar to application 230 or application 255 of FIG. 2 and application 310 of FIG. 3. While embodiments of the present disclosure are described in terms of environment 200 of FIG. 2 and server 300 of FIG. 3, it should be recognized that other systems may be utilized to perform the described method. One of skill in the art will appreciate that this flowchart explains a typical example, which can be extended to advanced applications or services in practice.

Method 400 typically starts at block 415 where the method detects a user login at a client device. The method proceeds to block 420, wherein configuration information of the client device and/or operating system associated with the user may be gathered. In another embodiment, the agent may gather the configuration information if there is a delta between the current configuration information and the last known configuration information. Otherwise, the agent may not gather the configuration information. For example, a flag may have been set to true from a default setting of false when the user makes a change in the configuration of the client device. After gathering the configuration information, agent 405 may transmit the configuration information to application 410. The configuration information may be associated with an identifier of the user, such as a username. In addition, it may also include information associated with the client device and/or the operating system of the client device. The configuration information can be transmitted in any suitable format or data structure and include one or more files, such as a form of JavaScript Object Notation (JSON) file.

The method proceeds to block 425 where the configuration information may be received by application 410 and then abstracted at block 430 from the operating system and\or client device form factor. The method proceeds to block 435, where the user's configuration/data abstraction model, or simply data abstraction model, may be recorded or saved in user configuration files which may be encapsulated as a user's configuration/data abstraction model and associated with a user identifier. The data abstraction model may be of various formats such as text files, XML files, and the like. If there is an existing data abstraction model, then the configuration information may be used to update the data abstraction model. Otherwise, a new data abstraction model may be generated. The method may apply data deduplication techniques to the configuration information before recording, saving, and/or updating the data abstraction model. The data abstraction model may include a plurality of logical fields abstractly describing the configuration information of one or more client devices and/or operating systems associated with a user identifier. The data abstraction model may be updated with each configuration change to a client device and/or operating system the user logs into.

The method proceeds to block 440 where the method may query the data abstraction model for information to display at a user interface. The user interface may be accessible through a web service for information technology administrators and computing device logistics managers who monitor a plurality of client devices and each one of the client devices' "readiness to switch" for improved planning and execution of client device refresh and/or migration. The readiness to switch is a threshold that may be used by information technology administrators and/or computing device logistics managers to judge the readiness to migrate a configuration to a target client device or operating system. The readiness to switch may be determined using several factors which include the number of file extensions present in the client device and the quantity of meaningful data that is present in the client device. For example, based on the number of file extensions present, a user with frequently accessed file extensions that are specific to a particular operating system such as Microsoft Outlook® archive and/ or macro-enabled Microsoft Excel® may not be considered ready to switch to an operating system that is not Microsoft Windows®. In another example, if there are frequently accessed data locally at a client device that has not been abstracted to the user abstraction layer or another data storage device. In addition, a machine learning algorithm may be used to present the user with the option to mark a client device as "ready to switch" which may be tied into information technology ticket management systems.

Figure 5:
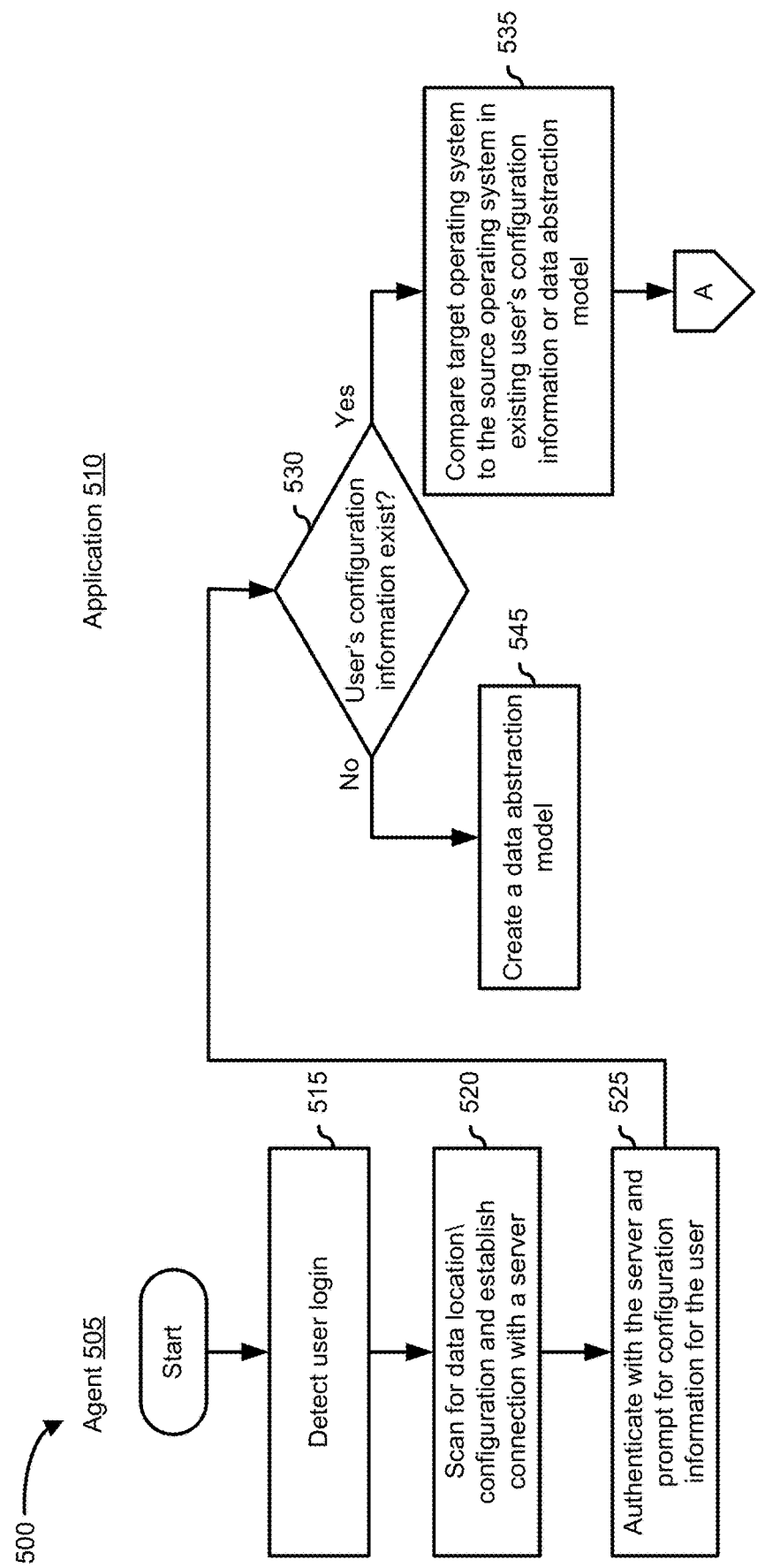
FIGS. 5, 6, and 7 are flowcharts illustrating an example of a method for migrating a configuration across information handling systems agnostic of operating systems, according to an embodiment of the present disclosure.

FIG. 5 shows a method 500 for migrating configuration information across information handling systems agnostic of operating systems. Method 500 may be performed by one or more components of environment 200 of FIG. 2 and server 300 of FIG. 3. In particular, block 515, block 520, and block 525 may be performed agent 505 while decision block 530, block 545, block 535, and block 540 may be performed by application 510. Agent 505 may be similar to agent 220, agent 235, or agent 265 of FIG. 2. Application 510 may be similar to application 230 or application 255 of FIG. 2 and application 310 of FIG. 3. While embodiments of the present disclosure are described in terms of environment 200 of FIG. 2 and server 300 of FIG. 3, it should be recognized that other systems may be utilized to perform the described method. One of skill in the art will appreciate that this flowchart explains a typical example, which can be extended to advanced applications or services in practice.

Method 500 typically starts at block 515 where the method detects a user login at a client device. Upon login, synchronization may occur to migrate or replicate the user's configuration(s) based on a source client device that the user may have previously configured with a custom device and/or user profile. This process continues when the user makes changes to the custom device profile and/or user profile in the source client device, wherein synchronization may occur to update the configuration of the client device, also referred to as a target client device, with the changes. The aforementioned synchronization may also be used for local data translation wherein the file structures of the source client device are replicated in the target client device.

The method proceeds to block 520 where the method may scan for the location of data and configuration of the client device. Afterwards, the method may establish a connection with either an on-premise or remote server and prompt for configuration information for the user at block 525. In addition, the method may authenticate with the on-premise or remote server before sending a request to retrieve the configuration information associated with the user. The request may include information associated with the target operating system's current configuration and a user identifier.

At decision block 530, the method determines whether configuration information and/or data abstraction model associated with the user exists in the abstraction layer and/or data storage. The method may use the user identifier to search for and identify configuration information from another client device. If the method determines that the user's configuration information and/or data abstraction model exists, then the "YES" branch is taken and proceeds to block 535. If the method determines that the user's configuration information and/or data abstraction model does not exist, then the "NO" branch is taken and the method proceeds to block 545 where the method generates a new data abstraction model associated with the user. At block 535, the method may compare the target operating system to the source operating system in the existing configuration information using various mechanisms such as a machine learning algorithm. The method proceeds to decision block 605 of FIG. 6.

Figure 6:
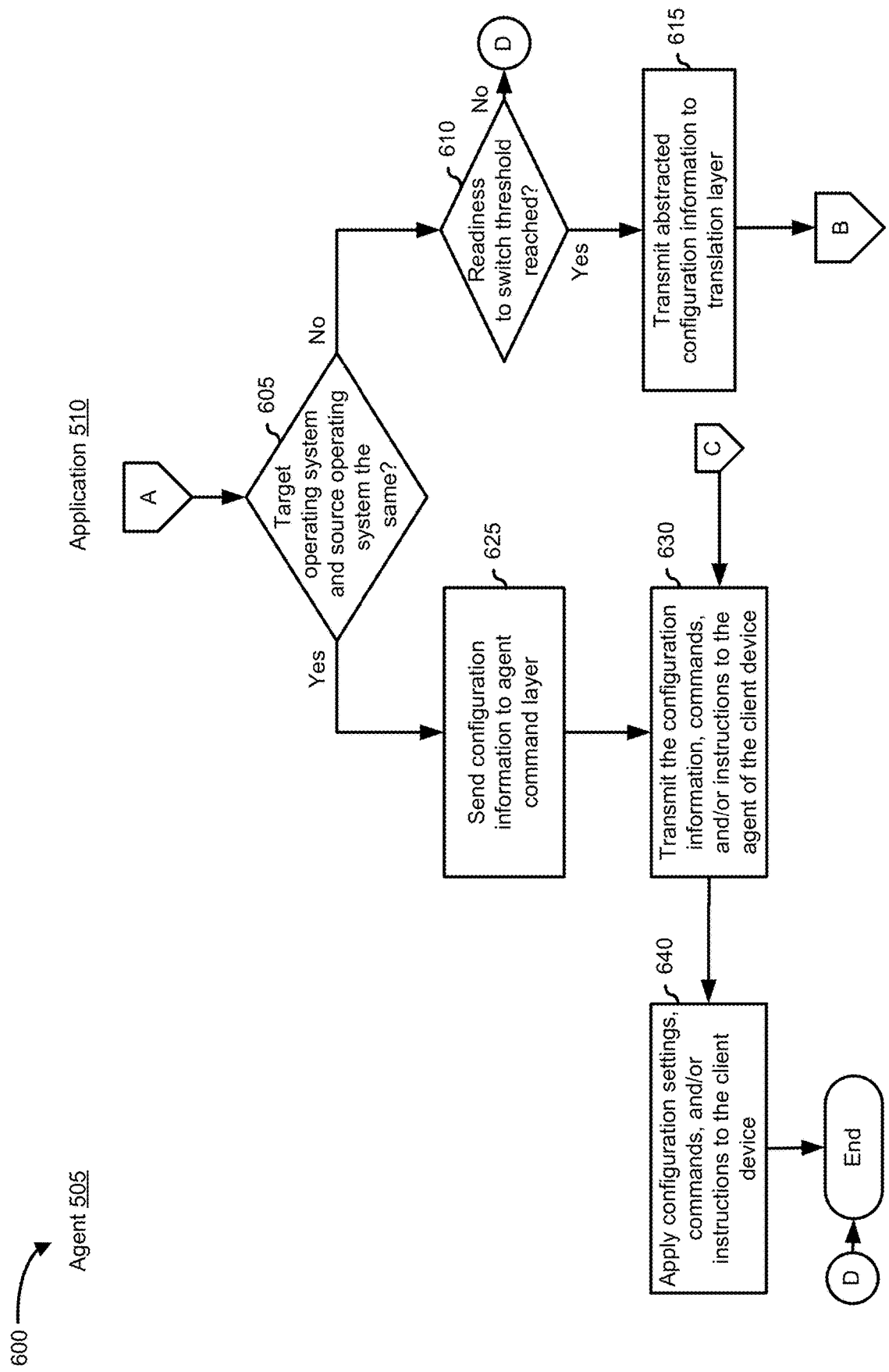

FIG. 6 shows a method 600 for migrating configuration information across information handling systems agnostic of operating systems. Method 600 is a continuation of method 500 of FIG. 5 and may be performed by one or more components of environment 200 of FIG. 2 and server 300 of FIG. 3. Method 600 typically starts at decision block 605 where the method determines if the target operating system and the source operating system are the same. If the target operating system is the same as the source operating system, then the "YES" branch is taken and the method proceeds to decision block 625 where the translation layer is skipped and the configuration information may be transmitted to the agent command layer. If the target operating system is not the same as the source operating system, then the "NO" branch is taken and the method proceeds to block 610.

At decision block 610, the method determines whether the readiness to switch threshold is reached. If the readiness to switch threshold is reached, then the "YES" branch is taken and the method proceeds to block 615. If the readiness to switch threshold is not reached, then the "NO" branch is taken and the method ends. At block 615, the abstracted configuration information may be transmitted by the abstraction layer to the translation layer for translation. When the target operating system is different than the operating system in which configuration information has been abstracted, the configuration information may be sent to the translation layer. The abstraction layer includes a machine layer algorithm that probabilistically "guesses" which setting from one operating system (source operating system) matches the dataset for another operating system (target operating system) based on data set comparison(s). The method proceeds to decision block 705 at FIG. 7.

At block 630, the method may transmit the translation to the agent command layer. At block 635, the agent command layer may transmit the configuration information, commands, and/or instructions to the agent of the client device. The configuration information, commands, and/or instructions may be based on the configuration information received from the abstraction layer and/or translation received from the translation layer. At block 640, the method may apply the configuration information, commands, and/or instructions to the client device and/or operating system, replication the configuration settings, device and/or user profile of the source client device and/or source operating system to the target client device and/or target operating system. The agent may continue reporting configuration settings and/or changes to the configuration settings to application 510 and applying configuration information, commands, and/or instructions received from application 510.

Figure 7:
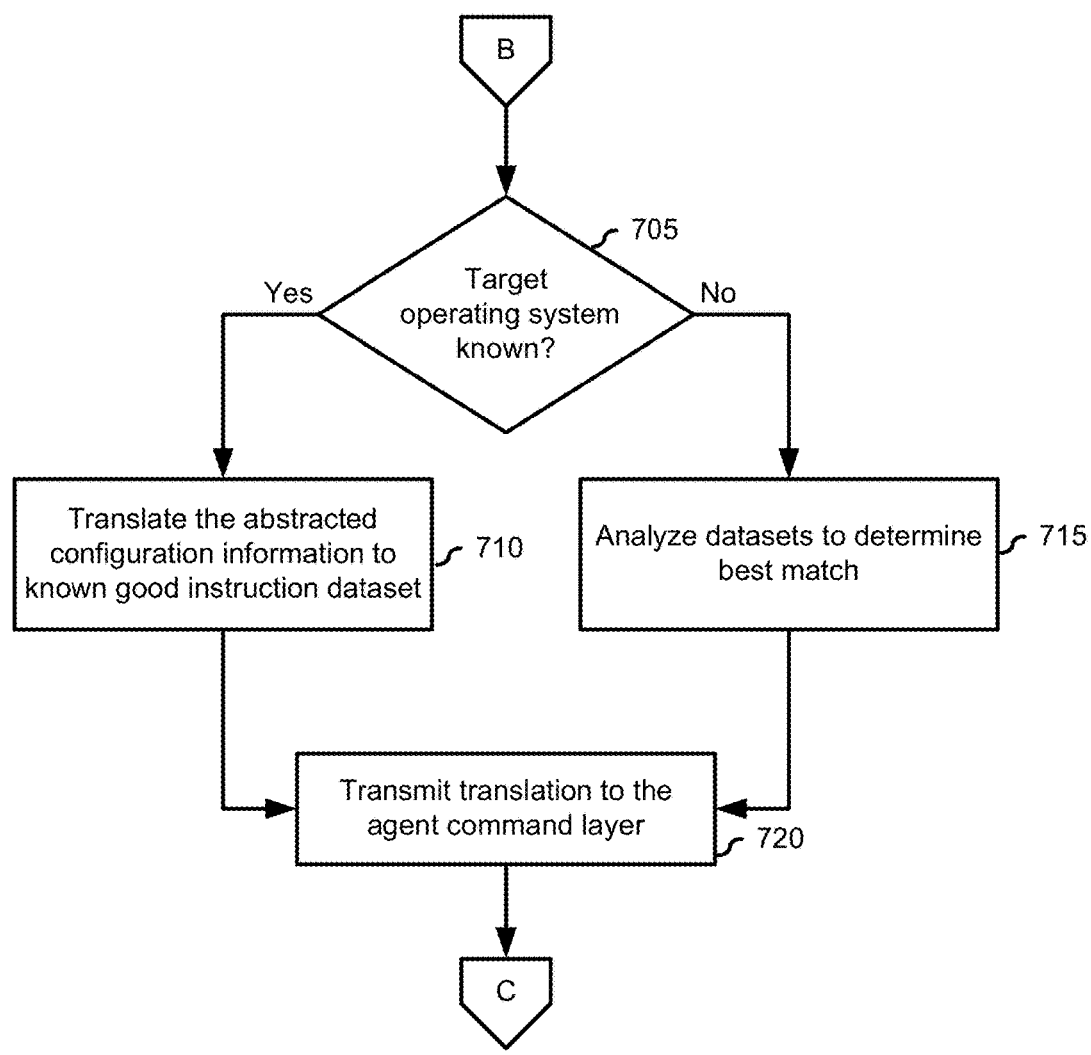

FIG. 7 illustrates a method 700 for migrating configuration information across information handling systems agnostic of operating systems. Method 700 is a continuation of method 600 of FIG. 6 and may be performed by one or more components of environment 200 of FIG. 2 and server 300 of FIG. 3. Method 700 typically starts at decision block 705 where the method determines if the target operating system is known, such as when the target operating system is part of a lookup table similar to lookup table 800 of FIG. 8. The target operating system may also be known if it is part of a data abstraction model and/or dataset with various configuration settings associated with the user. The target operating system may also be known if a graph similar to graph 900 of FIG. 9 has been generated for the said target operating system. Finally, the target operating system may be known if an adjacency matrix similar to adjacency matrix 1000 of FIG. 10 has been generated for the said target operating system. If the target operating system is known to the machine learning module in the translation layer, then the "YES" branch is taken and the method proceeds to block 710. If the target operating system is not known, then the "NO" branch is taken and the method proceeds to block 715.

At block 710, the method translates the configuration information which may have been abstracted to a known configuration setting and/or instruction to be transmitted to the agent command layer. At block 620, the method translates the abstracted configuration information to a known good instruction dataset. The translation may include configuration setting, commands, and/or instructions based on the target operating system. For example, the method may translate the registry keys of the Windows operating system to ChromeOS application programming calls. The method may apply one or more machine learning algorithms for the translation. The translation may include the corresponding instruction to reproduce or replicate the configuration settings, device, and/or user profile of the source client device on the target client device.

At block 715, the method analyzes datasets which include configuration information and/or data abstraction model to determine the best match for the configuration setting and/or instruction for transmission to the agent command layer. The translation layer may use a lookup table similar to lookup table 800 of FIG. 7 for the analysis. At block 720, the translated configuration settings, commands, and/or instructions are then transmitted to the agent command layer. The method proceeds to block 635 of FIG. 6.

FIG. 8 shows an example lookup table 800 for translating configuration information of a source operating system to configuration information of the target operating system. Lookup table 800 includes a set of configuration settings such as commands and accessibility features at column 805. In addition, lookup table 800 includes a set of target operating systems at column 810 and corresponding rows with instructions to apply the configuration settings according to the target operating system. Lookup table 800 may be used to map the configuration setting of a source operating system to a target operating system. For example, block 815 which is a configuration setting of Microsoft Windows which is the source operating system may be mapped to block 820 associated with Linux (Ubuntu) operating system which is the target operating system. Lookup table 800 may be used to find the maximum subset between the first operating system setting and the second operating system. For example, as shown, the configuration settings of Microsoft Windows can be mapped to configuration settings of ChromeOS. On the other hand, all but one of the configuration settings of Microsoft Windows can be mapped to Linux (Ubuntu). Although lookup table 800 includes mapping for three operating systems, additional operating systems may be added. Accordingly, lookup table 800 may include additional configuration settings than shown.

FIG. 9 shows an example graph 900 which is a representation of a file structure of a client device. Folders are represented as nodes while edges represent a hierarchal relationship between the nodes. For example, an edge between two nodes may represent that one of the folders represented by the nodes is a subfolder to the other node. Graph 900 may be used by the translation layer in applying various machine learning algorithms such as graph neural network in generating translations and/or instructions to replicate a configuration setting.

FIG. 10 shows an adjacency matrix 1000 which represents a relationship between nodes and edges of a file structure. In particular, adjacency matrix 1000 represents the graph of FIG. 9. Adjacency matrix 1000 indicates the relationships between nodes and/or edges. For example, adjacency matrix 1000 shows implied reference loops and implied back-edges to ancestors of the Microsoft Windows operating system wherein a user can traverse to self or on a back-edge to a parent or another ancestor represented as ones with zeros for non-traversals.

In another embodiment, other matrices may be generated to represent other relationships in the graph such as of the nodes, the edges, or between the nodes and the edges. A node attributes matrix may be generated to represent node attributes. An edge attributes matrix may be generated to represent edge attributes. For example, the node attributes matrix may be used to represent whether the folders (nodes) have the same characteristics such as name, size, visibility, etc. The edge attributes matrix may be used to represent whether the folders are protected such as if permissions are required to view the contents of the folders (edge traversals).

Although FIG. 4, FIG. 5, FIG. 6, and FIG. 7 show example blocks of method 400, method 500, and method 600 in some implementation, method 400, method 500, method 600, and method 700 may include additional blocks, fewer blocks, different blocks, or differently arranged blocks than those depicted in FIG. 4, FIG. 5, FIG. 6, and FIG. 7. Additionally, or alternatively, two or more of the blocks of method 400, method 500, method 600, and method 700 may be performed in parallel. For example, block 520 and block 525 of method 500 may be performed in parallel.

The term "user" in this context should be understood to encompass, by way of example and without limitation, a user device, a person utilizing or otherwise associated with the device, or a combination of both. An operation described herein as being performed by a user may therefore be performed by a user device, or by a combination of both the person and the device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particularly non-limiting exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
   a memory configured to store at least a portion of layers of an application stack; and
   a processor coupled to the memory, the processor configured to execute at least the portion of the layers of the application stack, the layers include:
      an abstraction layer configured to:
         receive a request from an agent to import a configuration setting to a first client device with a first operating system, wherein the configuration setting is associated with a user identifier;
         determine whether a data abstraction model associated with the user identifier exists in storage;
         determine whether the first operating system is same as a second operating system that is associated with the data abstraction model;
         when the first operating system and the second operating system are different, then transmit first configuration data to a translation layer, wherein the first configuration data is associated with the second operating system; and
         determine a readiness to switch threshold, wherein the readiness to switch threshold is determined based on frequently accessed local data of the first client device;
      the translation layer configured to:
         receive the first configuration data from the abstraction layer;
         translate a second configuration data based on the first configuration data to a translated configuration setting; and
         transmit an instruction associated with the translated configuration setting to an agent command layer; and
      the agent command layer configured to:
         receive the instruction from the translation layer; and
         transmit the instruction to the agent to replicate a second configuration setting of a second client device on the first client device.

2. The information handling system of claim 1, wherein the translation layer is further configured to determine a maximum subset of configuration setting between the first operating system setting and the second operating system.

3. The information handling system of claim 2, further comprising determining a configuration mapping based on the maximum subset of the configuration setting.

4. The information handling system of claim 1, wherein the abstraction layer is further configured to deduplicate the configuration setting.

5. The information handling system of claim 1, wherein the readiness to switch threshold is determined based on files that are restricted to a particular operating system.

6. The information handling system of claim 1, wherein the translation layer is configured to use a machine learning algorithm.

7. A method comprising:
   receiving, by a processor, a request from an agent to import a configuration setting to a first client device with a first operating system, wherein the configuration setting is associated with a user identifier;
   determining whether a data abstraction model associated with the user identifier is in storage;
   in response to determining that the data abstraction model is in the storage, retrieving the data abstraction model from the storage and determining whether the first operating system is same as a second operating system that is associated with the data abstraction model;
   in response to determining that the data abstraction model is not in the storage, generating the data abstraction model associated with the configuration setting;
   when the first operating system and the second operating system are different, then
   determining a readiness to switch threshold based on identifying a first set of data to be preserved versus a second set of data to be discarded prior to translating a second configuration data that is associated with the second operating system generating a translated configuration data associated with the first operating system, wherein the translated configuration data include the configuration setting based on first operating system; and
   transmitting a first set of instructions to the agent, wherein the first set of instructions is generated based on the translated configuration data, wherein the first set of instructions is used to replicate the configuration setting of a second client device on the first client device.

8. The method of claim 7, further comprising transmitting a second set of instructions associated with the configuration setting to the agent.

9. The method of claim 7, wherein the translating of the second configuration data includes determining a mapping between a first configuration data and the second configuration data.

10. The method of claim 7, wherein the translating of the second configuration data includes identifying similar structures between the first operating system and the second operating system.

11. The method of claim 7, wherein the translating of the second configuration data is based on training data abstraction model using a machine learning technique.

12. The method of claim 7, wherein the translating of the second configuration data is based on training data abstraction model using a graph neural network.

13. The method of claim 12, further comprising running logistic regression subsequent to the training of the data abstraction model using the graph neural network.

14. An information handling system, comprising:
a memory configured to store at least a portion of layers of an application stack; and
a processor coupled to the memory, the processor configured to execute at least the portion of the layers of the application stack, the layers include:
an abstraction layer configured to:
receive a request from an agent to import a configuration setting to a first client device with a first operating system, wherein the configuration setting is associated with a user identifier;
determine whether a data abstraction model that is associated with the user identifier exists in storage, wherein the data abstraction model is based on the configuration setting of a second client device with a second operating system; and
if the first operating system and the second operating system are same, then transmit instructions associated with the configuration setting to an agent command layer;
if the first operating system and the second operating system are different, then determine whether a readiness to switch threshold is reached to switch to the configuration setting on the first client device, wherein the readiness to switch threshold is determined based on frequently accessed local data of the first client device; and
the agent command layer configured to:
receive the instructions from the abstraction layer; and
in response to reaching the readiness to switch threshold, transmit the instructions to the agent, wherein the instructions are used to replicate the configuration setting on the first client device.

15. The information handling system of claim 14, wherein the data abstraction model is updated based on a change to a second configuration setting of the second client device.

16. The information handling system of claim 14, further comprising replicating a file structure of the second client device on the first client device.

17. The information handling system of claim 14, further comprising deduplicating data in the data abstraction model.

* * * * *

UNITED STATES PATENT AND TRADEMARK OFFICE
CERTIFICATE OF CORRECTION

PATENT NO. : 11,330,081 B1  
APPLICATION NO. : 17/222468  
DATED : May 10, 2022  
INVENTOR(S) : Andrew Fellers et al.

It is certified that error appears in the above-identified patent and that said Letters Patent is hereby corrected as shown below:

In the Claims

Column 22, Line 4: Please change "laver" to --layer--

Signed and Sealed this
Twenty-eighth Day of June, 2022

Katherine Kelly Vidal
*Director of the United States Patent and Trademark Office*